(12) United States Patent
Yamakata et al.

(10) Patent No.: US 12,680,296 B2
(45) Date of Patent: Jul. 14, 2026

(54) BUILDING WALL AND BUILDING WALL CONSTRUCTION METHOD

(71) Applicant: YOSHINO GYPSUM CO., LTD., Tokyo (JP)

(72) Inventors: Kouji Yamakata, Tokyo (JP); Shigeto Hino, Tokyo (JP); Yusuke Watanabe, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 146 days.

(21) Appl. No.: 18/722,718

(22) PCT Filed: Jan. 19, 2023

(86) PCT No.: PCT/JP2023/001581
§ 371 (c)(1),
(2) Date: Jun. 21, 2024

(87) PCT Pub. No.: WO2023/149223
PCT Pub. Date: Aug. 10, 2023

(65) Prior Publication Data
US 2025/0059757 A1 Feb. 20, 2025

(30) Foreign Application Priority Data
Feb. 7, 2022 (JP) ................................. 2022-017489

(51) Int. Cl.
*E04B 1/94* (2006.01)
*B32B 3/14* (2006.01)
(Continued)

(52) U.S. Cl.
CPC ................. *E04B 1/94* (2013.01); *B32B 3/14* (2013.01); *B32B 7/08* (2013.01); *B32B 7/12* (2013.01);
(Continued)

(58) Field of Classification Search
CPC .................................................. B32B 2607/00
See application file for complete search history.

(56) References Cited

U.S. PATENT DOCUMENTS

| | | | | |
|---|---|---|---|---|
| 4,328,652 A | * | 5/1982 | Naumovich, Jr. ........ | E04B 1/76 52/408 |
| 5,417,023 A | * | 5/1995 | Mandish ................... | E04B 2/58 52/656.1 |

(Continued)

FOREIGN PATENT DOCUMENTS

| | | | | |
|---|---|---|---|---|
| AU | 5706200 | | 1/2001 | |
| AU | 2023332103 A1 | * | 1/2025 | ........... E04B 2/7409 |

(Continued)

OTHER PUBLICATIONS https://drywall101.com/en/articles/hanging/number-of-screws-per-sheet (Year: 2020).*

(Continued)

*Primary Examiner* — Babajide A Demuren
(74) *Attorney, Agent, or Firm* — IPUSA, PLLC

(57) ABSTRACT

A building wall is provided with at least an underlay face member and an overlay face member, the underlay face member directly or indirectly connected to a stud, the overlay face member being an indoor-facing member and connected to the underlay face member, wherein the overlay face member is connected to the underlay face member via at least an adhesive, and wherein a coating amount of the adhesive is less than 100 g/m$^2$.

7 Claims, 8 Drawing Sheets

(51) Int. Cl.

| | |
|---|---|
| *B32B 7/08* | (2019.01) |
| *B32B 7/12* | (2006.01) |
| *B32B 13/04* | (2006.01) |

(52) U.S. Cl.
CPC .......... *B32B 13/04* (2013.01); *B32B 2255/26* (2013.01); *B32B 2307/306* (2013.01); *B32B 2607/00* (2013.01)

(56) References Cited

U.S. PATENT DOCUMENTS

| | | | | |
|---|---|---|---|---|
| 5,724,783 | A * | 3/1998 | Mandish | E04B 2/58 |
| | | | | 52/404.3 |
| 5,749,187 | A | 5/1998 | Umehara et al. | |
| 6,047,519 | A * | 4/2000 | Bagn | E04C 2/384 |
| | | | | 52/656.1 |
| 11,885,124 | B2 * | 1/2024 | Haller | E04C 2/34 |
| 12,312,809 | B2 * | 5/2025 | Sudo | E04C 2/46 |
| 2014/0115989 | A1 * | 5/2014 | Sievers | E04B 2/02 |
| | | | | 52/302.1 |

FOREIGN PATENT DOCUMENTS

| | | | | | |
|---|---|---|---|---|---|
| CA | 3131489 | A1 * | 9/2020 | ........... | C08F 232/08 |
| EP | 1007803 | | 9/2004 | | |
| JP | 2002-004455 | | 1/2002 | | |
| JP | 2010-059634 | | 3/2010 | | |
| JP | 2014-109096 | | 6/2014 | | |
| JP | 2020-169468 | | 10/2020 | | |
| JP | 2021-130963 | | 9/2021 | | |
| WO | 01/02660 | | 1/2001 | | |
| WO | WO-0102660 | A1 * | 1/2001 | ............. | E04F 13/00 |

OTHER PUBLICATIONS https://drywall101.com/en/articles/hanging/number-of-screws-per-sheet Drywall Screws Per Sheet of Drywall (Year: 2020).*

International Search Report for PCT/JP2023/001581 mailed on Feb. 28, 2023.

Written Opinion of the International Searching Authority for PCT/JP2023/001581 mailed on Feb. 28, 2023.

Extended European search report mailed on Feb. 28, 2025 with respect to the corresponding European patent application No. 23749539.5.

* cited by examiner

BUILDING WALL AND BUILDING WALL CONSTRUCTION METHOD

TECHNICAL FIELD

The present disclosure relates to building walls and construction methods for the building walls.

BACKGROUND OF THE INVENTION

Conventionally, a method for constructing a building wall, such as a partition wall or an indoor-facing wall of an exterior wall by attaching a building face member to studs (intermediate posts), is performed by a method of connecting a single face member for construction to the studs erected at intervals in a horizontal direction with piercing-type connecting means, such as fastening members. Here, in a case where a building wall is formed of the single building face member, the single building face member is connected to a flange of a stud formed of, for example, channel steel.

In contrast to this, in a multi-layer structure in which a building wall includes two building face members, for example, a method is performed by which an overlay face member that is a face member for construction is connected to studs by fastening members or the like, an adhesive, such as a vinyl acetate-based adhesive, is applied to a back surface of an overlay face member, and the back surface of the overlay face member is adhered to a surface of the underlay face member. In this adhesion-based connection method, since a certain time is required until the adhesive cures, a method is applied by which the overlay face member is tentatively attached to the underlay face member, and then the overlay face member is tentatively connected to the underlay face member by first piercing the surface of the overlay face member with connecting means, such as a staple. The staples are left in place, so that the underlay face member and the overlay face member are connected to each other by both the adhesive and the staples.

The amount of adhesive used on the underlay and overlay face members is generally on the order of 150 g/m² or more, and multiple staples are used to tentatively connect a single overlay face member. For example, Patent Document 1 also proposes a partition wall in which an underlay face member is fixed to studs by self-tapping screws, fastening members, or the like, and an overlay face member is fixed to the underlay face member by an organic adhesive member and staples.

Besides connection by use of both an adhesive and staples as described above, connection by use of only an adhesive or connection by use of only staples is conceivable for connecting the overlay face member to the underlay face member, but in any of these connection types, the integrity of the multi-layer structure can be enhanced by firmly connecting the underlay face member the overlay face member together. Therefore, during a fire, deformation of the underlay on the fire side is substantially prevented by restraint from the overlay to maintain a contact state between both the overlay and the underlay, and when heat during the fire gets transferred from the underlay to the overlay on the no-fire side, the overlay deforms due to this heat, and as a consequence of this, the overlay tends to fall off from the underlay.

RELATED ART DOCUMENTS

Patent Document

Patent document 1: Japanese Unexamined Patent Application Publication No. 2020-169468

SUMMARY OF THE INVENTION

Problems to be Solved by the Invention

The present disclosure provides a building wall with which, during a fire, deformation of the underlay on the fire side is substantially prevented by restraint from the overlay to maintain a contact state between both the overlay and the underlay, yet when heat during the fire gets transferred from the underlay to the overlay on the no-fire side, the overlay face member included in the overlay can be substantially prevented from falling off from the underlay.

Means for Solving the Problem

A building wall according to one aspect of the present disclosure provided with at least an underlay face member and an overlay face member, the underlay face member directly or indirectly connected to a stud, the overlay face member being an indoor-facing member and connected to the underlay face member, wherein the overlay face member is connected to the underlay face member via at least an adhesive, and wherein a coating amount of the adhesive is less than 100 g/m².

Further, a building wall according to another aspect of the present disclosure provided with at least an underlay face member and an overlay face member, the underlay face member directly or indirectly connected to a stud, the overlay face member being an indoor-facing member and connected to the underlay face member, wherein the overlay face member is connected to the underlay face member via at least a first fastener, and wherein a number of fasteners of the first fastener is 7.2 fasteners/m² to 32.7 fasteners/m², inclusive.

Further, a building wall according to another aspect of the present disclosure provided with an underlay face member and an overlay face member, the underlay face member connected to a stud, the overlay face member being an indoor-facing member and connected to the underlay face member, wherein the overlay face member is connected to the underlay face member via an adhesive, a first fastener, or both, wherein the underlay face member is connected to the stud via a second fastener, and wherein a number of fasteners of the second fastener is less than 5.0 fasteners/m.

Further, a building wall according to another aspect of the present disclosure with an underlay face member, an overlay face member, and an additional face member, the additional face member connected to a stud, the underlay face member connected to the additional face member, and the overlay face member connected to the underlay face member, wherein the underlay face member is connected to the additional face member via a third fastener, wherein the overlay face member is connected to the underlay face member via an adhesive, a first fastener, or both, wherein the additional face member is connected to the stud via a second fastener, and

wherein a number of fasteners of the second fastener is less than 5.0 fasteners/m.

Also, a method, according to another aspect of the present disclosure, for constructing a building wall provided with at least an underlay face member and an overlay face member, the underlay face member directly or indirectly connected to a stud, the overlay face member being an indoor-facing member and connected to the underlay face member, the method including:

an underlay face member-connecting step of connecting the underlay face member to the stud directly or indirectly; and an overlay face member-connecting step of connecting the overlay face member to the underlay face member via at least an adhesive, wherein a coating amount of the adhesive is set to be less than 100 g/m$^2$.

Effects of the Invention

According to the present disclosure, a building wall with which, during a fire, deformation of the underlay on the fire side is substantially prevented by restraint from the overlay to maintain a contact state between both the overlay and the underlay, yet when heat during the fire gets transferred from the underlay to the overlay on the no-fire side, the overlay face member included in the overlay can be substantially prevented from falling off from the underlay.

DETAILED DESCRIPTION OF THE INVENTION

Figure 1:
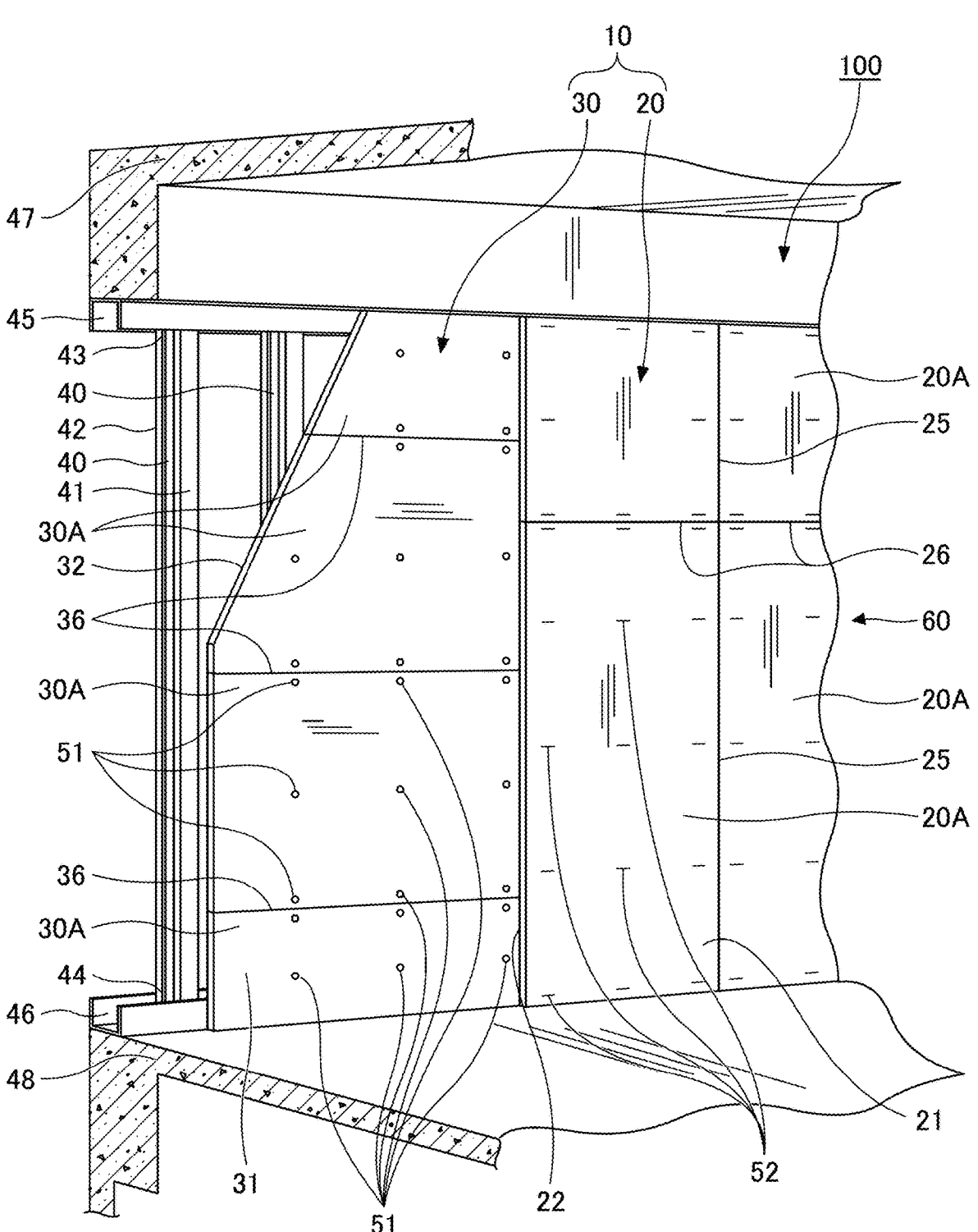
FIG. 1 is a perspective view illustrating an example of a building wall according to an embodiment.

Hereinafter, an example of a building wall and a construction method according to an embodiment is described with reference to the accompanying drawings. In the specification and drawings, components that are substantially the same are denoted by the same reference numerals, and redundant description thereof is omitted in some cases.

Building Wall and Building Wall Construction Method According to Embodiment

Figure 2:
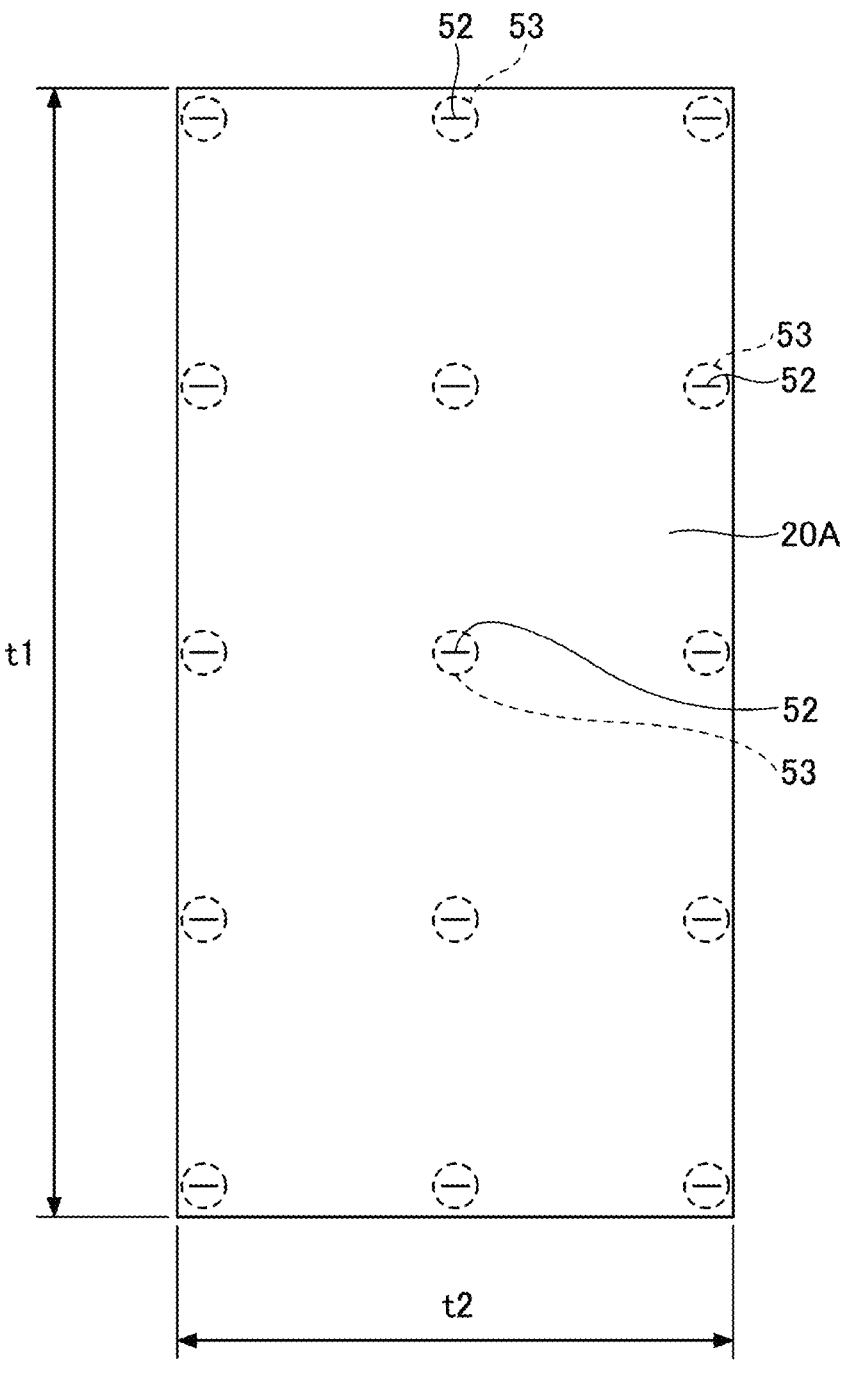
FIG. 2 is a drawing illustrating coating positions of an adhesive and fastening positions of a first fastener in an example of a configuration in which an overlay face member is connected to an underlay face member.
Figure 3:
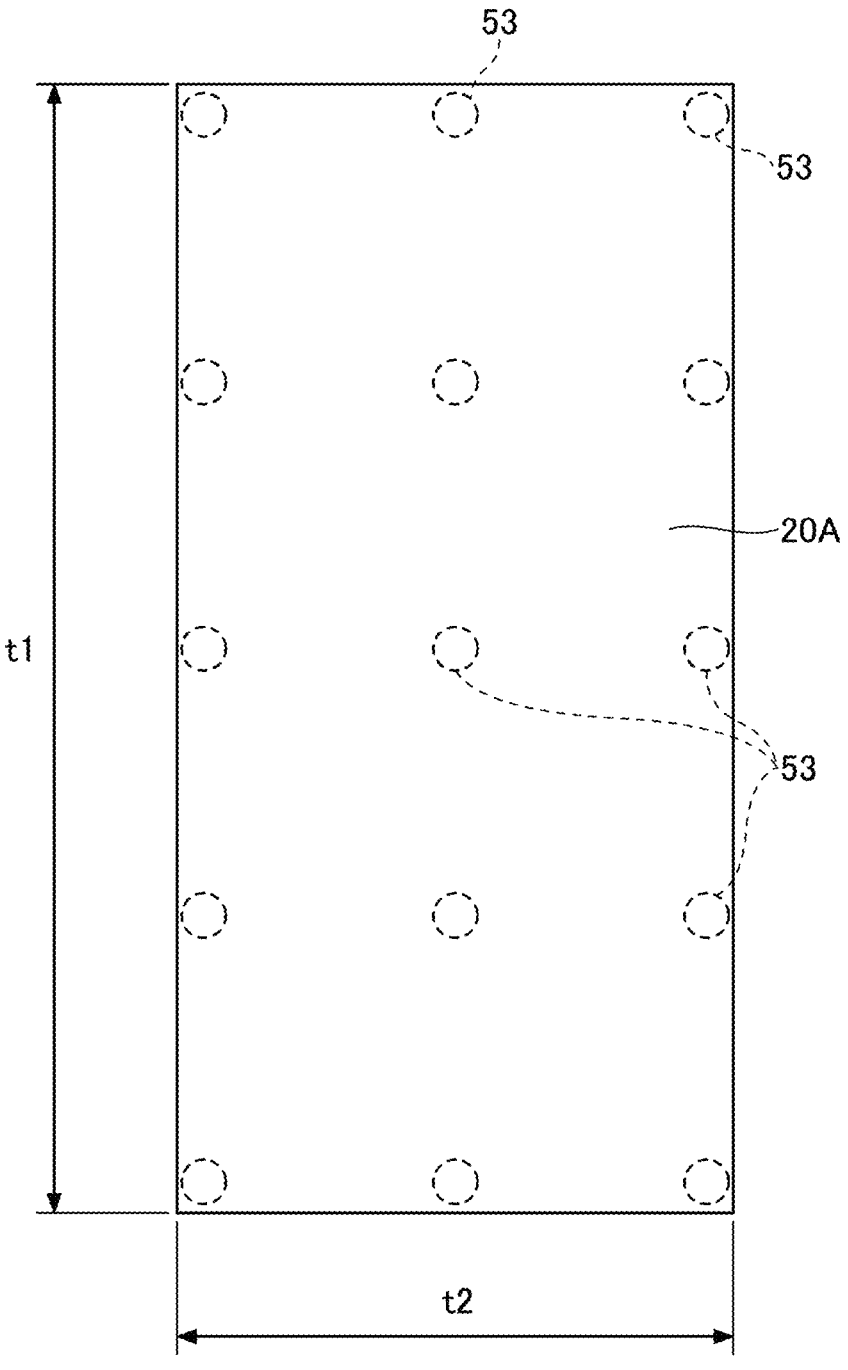
FIG. 3 is a drawing illustrating coating positions of the adhesive in an example in which an overlay face member is connected to an underlay face member.
Figure 4:
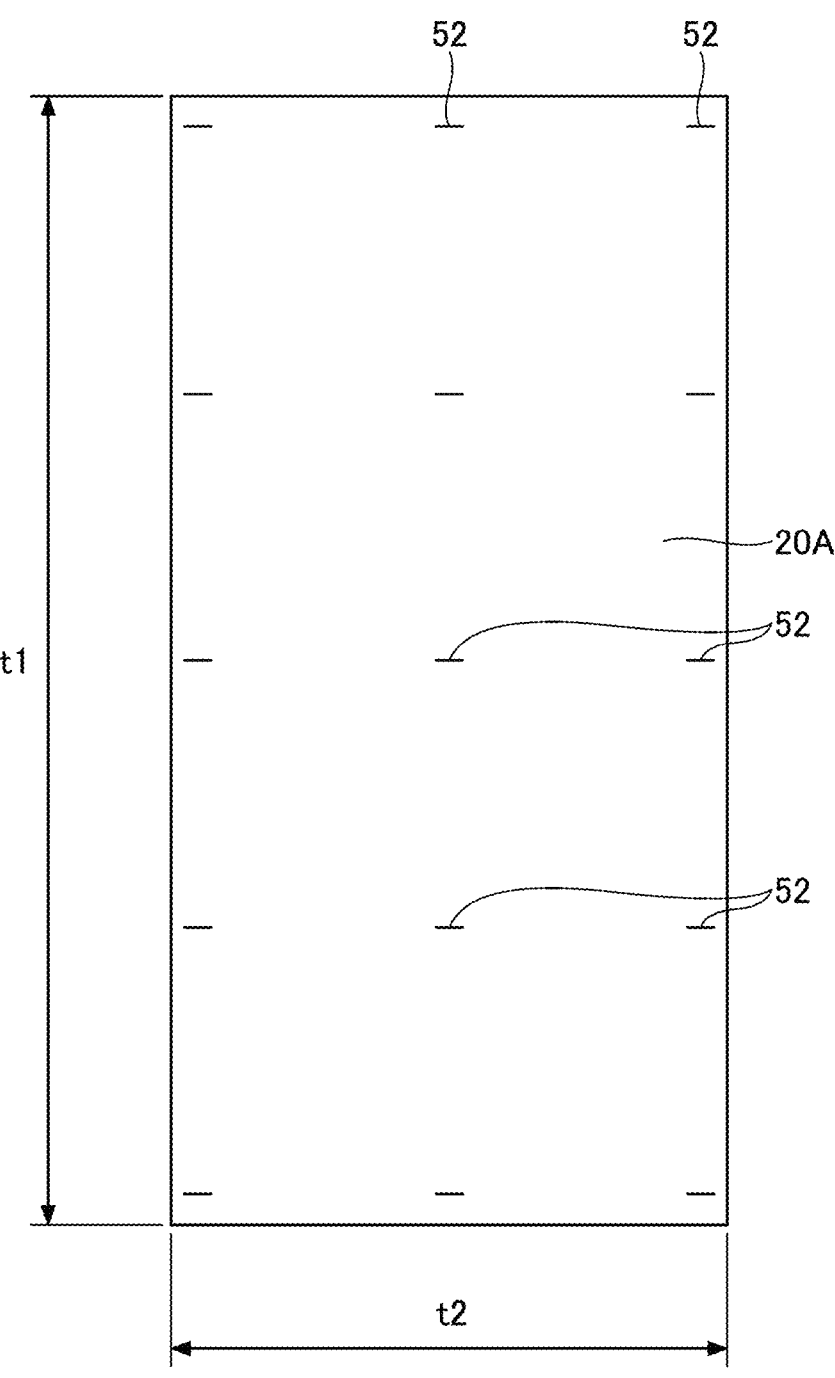
FIG. 4 is a drawing illustrating fastening positions of the first fastener in an example in which an overlay face member is connected to an underlay face member.

First, an example of a building wall and a construction method of the building wall according to an embodiment is described with reference to FIGS. 1 to 7. FIG. 1 is a perspective view illustrating an example of the building wall according to the embodiment. Also, each of FIGS. 2 to 4 is an example of a configuration in which an overlay face member is connected to an underlay face member. FIG. 2 is a drawing illustrating coating positions of an adhesive and fastening positions of a first fastener. FIG. 3 is a drawing illustrating coating positions of the adhesive. FIG. 4 is a drawing illustrating fastening positions of the first fastener.

Here, the building wall in the illustrated example in the drawings is a partition wall having, on both sides of the studs, a multi-layer structure having two layers one being an overlay and the other being an underlay, but instead of this, the building wall may be a partition wall having a multi-layer structure having three or more face members on both surfaces of the studs. Alternatively, the partition wall may have the double-layer structure or the triple-layer structure on only one side of the studs. Further, the wall may be an indoor-side wall of an exterior wall, instead of the partition wall. As in the illustrated example in the drawings, in the partition wall with the double-layer structure, the underlay is attached directly to the stud. In the case where the configuration is a multi-layer structure in which three or more face members are overlaid, a separate face member that is in a contact state with the underlay face member illustrated in the figure is attached to the stud, and therefore the underlay face member is attached to the stud indirectly.

A partition wall 100 illustrated in FIG. 1 is applied to a steel-framed building, a reinforced concrete (RC) building, a wooden building, or the like, and these buildings include a factory, a warehouse, and the like in addition to typical detached houses multiple dwelling complexes, such as condominiums.

The partition wall 100 has multiple studs 40, a lower runner 46 (or a floor runner), and an upper runner 45 (or a ceiling runner) constituting a main framework. The studs 40 extend in the longitudinal direction (vertical direction), and the upper runner 45 and the lower runner 46 extend in the lateral direction (horizontal direction).

Both the upper runner 45 and the lower runner 46 are formed of a lightweight steel frame, such as grooved steel, and the upper runner 45 is attached to an upper floor structure 47 with the opening facing downward, and the lower runner 46 is mounted to a lower floor structure 48 in a posture with the opening facing upward.

The studs 40 are formed of grooved steel with lips that are lightweight steel frames, but may be formed of groove steel or a square steel pipe.

An upper end 43 and a lower end 44 of each stud 40 are fixed to the upper runner 45 and the lower runner 46, respectively, and thus each stud 40 is fixed to the upper runner 45 and the lower runner 46. Here, although not illustrated, multiple stoppers extending in the horizontal direction may be provided at a predetermined pitch (e.g., 1,200 millimeter (mm) pitch) in the height direction of the studs 40.

The upper runner 45, the lower runner 46, and the studs 40 are, for example, lightweight steel frame members having a thickness of 0.4 mm or more, and steel runners and steel studs specified in Japanese Industrial Standards (JIS) A 6517 ("building steel base material"), or equivalent, compliant, or compatible materials may be used. In the partition wall 100, the multiple studs 40 are built between the lower runner 46 and the upper runner 45 at intervals of 606 mm or less (for example, intervals of 606 mm or 455 mm) in the width direction of the wall (longitudinal direction of the lower runner 46 and the like in FIG. 1).

In the partition wall 100, back surfaces 32 of underlay face members 30A arranged laterally are abutted against a pair of mounting surfaces 41 and 42 of the stud 40, and are connected to the mounting surfaces 41 and 42 on both sides of the stud 40 by fastening members 51 (an example of a second fastener), such as screws or the like from a front surface 31 side thereof. An underlay 30 is formed by multiple underlay face members 30A connected to the studs 40.

In contrast to this, as illustrated in FIG. 2, a back surface 22 of an overlay face member 20A that is disposed vertically is adhered to the underlay 30 by an adhesive 53, and is connected to the underlay 30 by staples 52 (example of a first fastener) driven in from an indoor-side surface 21 in front of the overlay face member 20A. An overlay 20 is formed by multiple overlay face members 20A connected to the underlay 30.

Thus, on both sides of the stud 40, a multi-layer structure 10 that is double-layered is formed of the underlay 30 and the overlay 20. Here, in addition to the illustrated example, a configuration in which the underlay face member 30A is vertically disposed and the overlay face member 20A is horizontally disposed may be adopted. Although not illustrated, in a configuration in which the multi-layer structure has three or more face members, an additional face member (an additional member that is different from the overlay face member and the underlay face member) is connected to the stud by the second fastener, such as a fastening member, the underlay face member is connected to the additional face member by a third fastener such as a fastening member, and the overlay face member is connected to the underlay face member by the first fastener, such as the staples. In such a case, the third fastener such as the fastening member may be driven in through the additional member to the stud.

As the underlay face member 30A that is a face member for construction, a gypsum plate, a gypsum board, a calcium silicate board, a particle board, a hardboard, plywood, structural plywood, or the like can be applied, and among them, the gypsum plate or gypsum board can be suitably used.

In contrast to this, as the overlay face member 20A that is a face member for construction, a gypsum plate, a gypsum board, a calcium silicate board, or the like can be used, and among them, the gypsum plate or the gypsum board can be suitably used.

Here, in addition to a general gypsum board, the gypsum board includes a reinforced gypsum board, an ordinary hard gypsum board, a sheathing hard gypsum board, a moisture absorptive and desorptive reinforced gypsum board, a moisture absorptive and desorptive ordinary gypsum board, a moisture absorptive and desorptive sheathing hard gypsum board, a gypsum plate with a glass fiber nonwoven fabric, a glass mat gypsum board, and the like.

For example, in a case where the gypsum board is adopted, the dimensions of the short side, the long side, and the thickness thereof are 910 mm×1,820 mm×9.5 mm for quasi-non-combustible material or are 910 mm×1,820 mm (2,420 mm or 2,730 mm)×12.5 mm (15 mm, 21 mm or 25 mm) for non-combustible material or the like. The width of the gypsum board may be 606 mm, 1,000 mm, 1,220 mm, or the like, instead of 910 mm.

Here, as the adhesive 53 that connects the overlay face member 20A to the underlay 30, a vinyl acetate resin-based adhesive, an acrylic resin-based adhesive, a urethane resin-based adhesive, an epoxy resin-based adhesive, a polyamide-based adhesive, a polysulfide-based adhesive, a silicone-based adhesive, or a synthetic rubber adhesive, for example, can be used. Examples of the vinyl acetate resin-based adhesive include the Yoshino Gypsum Co., Ltd. Manufactured product name: Yoshino Sakubi Bond (Purity of from 34% to 38%, inclusive).

In the underlay 30, a vertical joint (not illustrated) that is a butt joint and a horizontal joint 36 that is also a butt joint are provided between the multiple underlay face members 30A that are adjacent to each other in the vertical and horizontal directions.

In contrast to this, in the overlay 20, a vertical joint 25 that is a gapped joint and a horizontal joint 26 that is also a gapped joint are provided between the multiple overlay face members 20A adjacent to each other in the vertical and horizontal directions.

The overlay face member 20A illustrated in FIG. 2 has a vertical length t1 of 1,820 mm and a horizontal width t2 of 910 mm. As illustrated in FIG. 2, in the form in which connecting of the underlay 30 and the overlay 20 is performed by using the staples 52 and the adhesive 53, the amounts of the staples 52 and the adhesive 53 used are substantially reduced as compared to a case where conventional staples and adhesive are used.

In the example illustrated in FIG. 2, one set of the staple 52 and the adhesive 53 is provided at a position where the staple 52 and the adhesive 53 overlap with each other. The sets, each consisting of the staple 52 and the adhesive 53, are provided in an array of three columns by five rows and the pitch between sets in any two columns is the same.

More specifically, the amount of the adhesive 53 to be coated is set to be less than 100 g/m$^2$ (grams/meters$^2$). This is substantially less than the conventional amount of an adhesive which is 150 g/m$^2$. Here, the method for calculating the coating amount is as follows. The adhesive 53 to be coated is calculated by dividing the amount of the adhesive 53 used for one board by the area of the one board (for example, 1.82 m×0.91 m=1.66 m$^2$).

In the less-than-100 g/m$^2$ range, the amount of the adhesive 53 to be coated is preferably in a range of from 10 g/m$^2$ to 50 g/m$^2$, inclusive, and more preferably in a range of from 10 g/m$^2$ to 30 g/m$^2$, inclusive. Here, 10 g/m$^2$ as the coating amount of the adhesive 53 is the minimum amount necessary for ensuring that the overlay face member 20A adheres to the underlay face member 30A under normal conditions (when there is no fire).

In contrast to this, the number of the staples 52 (first fastener) is set to be an amount in a range of from 7.2 staples/m$^2$ though to 32.7 staples/m$^2$, inclusive. This amount is less than that of the conventional amount of staples which is 40 staples/m$^2$ (staples/meters$^2$). Although a square U-shaped staple and a round U-shaped staple each have two piercing legs, a single staple is to be counted as one. For a T-shaped staple or the like that has one piercing leg, a single staple is also to be counted as one. Here, the method for calculating the number of the staples 52 is: the number of the first fasteners 52 to be used for a single board divided by the area of the single board.

The number of the staples 52 is preferably in a range of from 7.2 staples/m$^2$ to 19.1 staples/m$^2$, inclusive within the larger range of from 7.2 staples/m$^2$ to 32.7 staples/m$^2$, inclusive. Here, 7.2 staples as the number of the staples 52 is the minimum number of staples necessary for ensuring that the overlay face member 20A fastens to the underlay face member 30A under normal conditions (when there is no fire).

The connection of the overlay 20 to the underlay 30 may be in the form illustrated in FIG. 3 or FIG. 4, besides the form illustrated in FIG. 2.

The form illustrated in FIG. 3 is a form in which the underlay 30 and the overlay 20 are connected by only the adhesive 53. In this connection form as well, the coating amount of the adhesive 53 is set to be less than 100 g/m², yet since the first fastener is not used, it is preferable to apply an coating amount that is close to the upper limit value of this numerical range.

In contrast to this, the form illustrated in FIG. 4 is a form in which the underlay 30 and the overlay 20 are connected by only the staples 52 (first fastener). In this form as well, the number of the staples 52 is set to be in a range of from 7.2 staples/m² to 32.7 staples/m², inclusive, and since no adhesive is used, it is preferable to apply a number of staples that is close to the upper limit value of this numerical range.

Next, an example of a deformation behavior of the overlay and the underlay during a fire and a state of the multi-layer structure is described with reference to FIG. 5A and FIG. 5B. Here, FIG. 5A is a side view illustrating an example of a deformation behavior of the underlay and the overlay during a fire and a state of a multi-layer structure during the fire, in a configuration in which the underlay face member and the overlay face member illustrated in FIG. 2 to FIG. 4 are connected, whereas FIG. 5B is a B-direction arrow view in FIG. 5A.

Figure 5A:
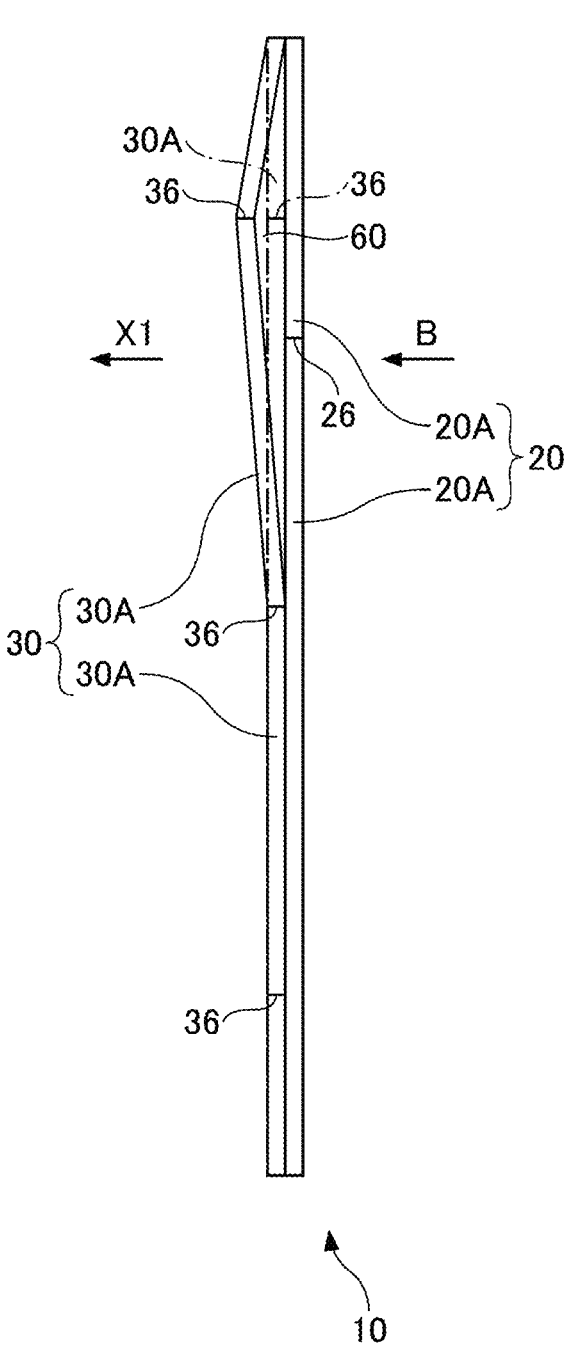
FIG. 5A is a side view illustrating an example of a deformation behavior of the underlay and the overlay during a fire and a state of a multi-layer structure during the fire, in a configuration in which the underlay face member and the overlay face member illustrated in FIG. 2 to FIG. 4 are connected.
Figure 5B:
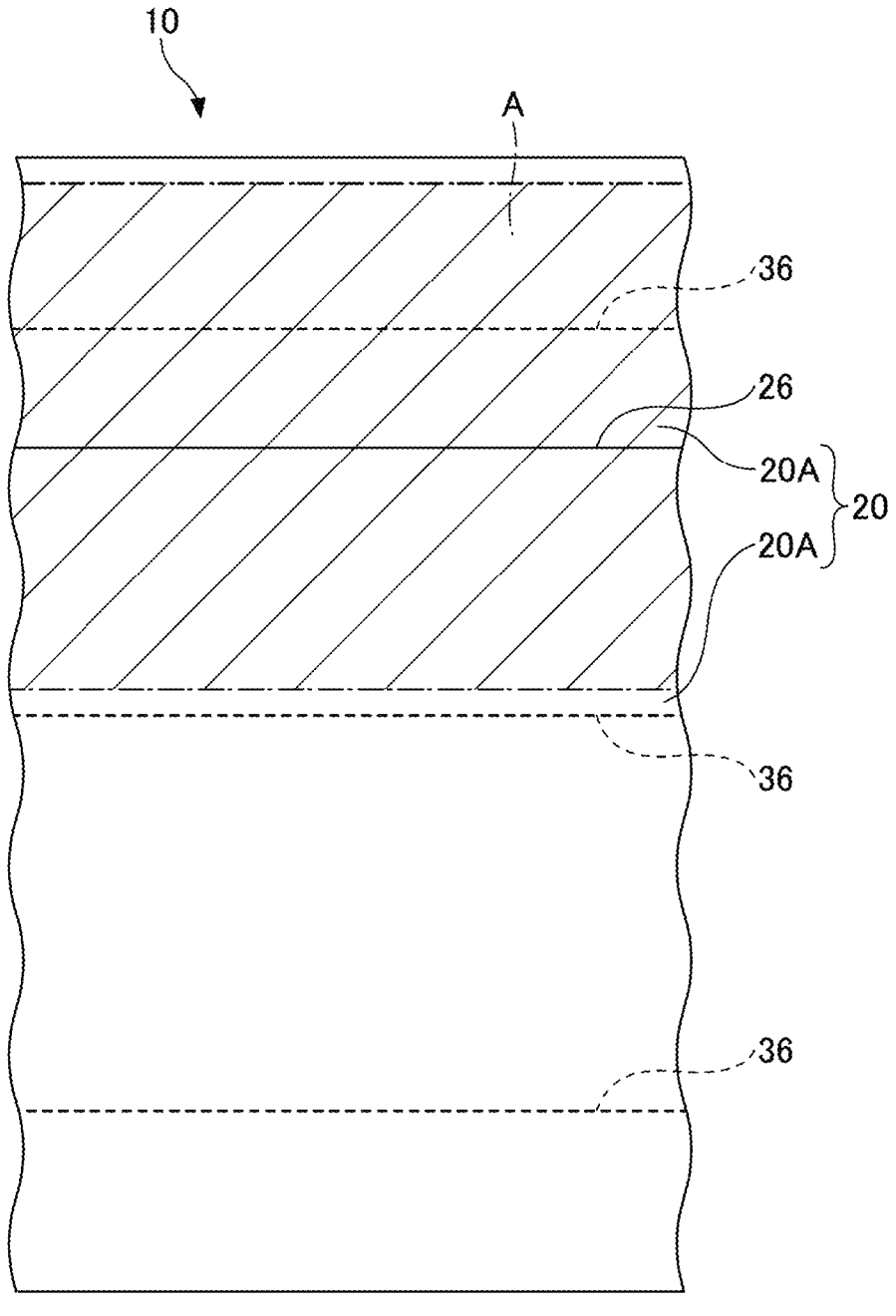
FIG. 5B is a B-direction arrow view in FIG. 5A.

In FIG. 5A, the side where the underlay 30 of the multi-layer structure 10 is represents the fire side, i.e., the side where the fire is, whereas the overlay 20 on the side facing indoors, represents the no-fire side, i.e., the side where there is no fire.

Since heat of the fire increases from the upper side (ceiling side) in the room, even the inner portion of the underlay 30 in this upper region readily becomes deformed by the heat of the fire, and thus deforms in the X1 direction toward the fire side as in the illustrated example. Here, in FIG. 5A, the dashed-and-dotted line represents the underlay 30 before deformation, whereas the solid line represents the underlay 30 after deformation.

According to the inventors of the present application, the horizontal joint 36 and its vicinity are weak in strength even on the upper side of the underlay 30 and tend to deform, and it was identified that deformation takes place in accordance with the deformation behavior illustrated in FIG. 5A by setting the coating amount of the adhesive 53 and the number of the first fasteners 52 that connect the underlay 30 and the overlay 20 together to values within the previously-described numerical ranges. The lower side of the underlay 30 deforms only a little because the heat acting thereon is relatively low as compared to that of the upper side of the underlay 30, and in some cases, hardly any deformation occurs.

Also, since the upper region of the underlay 30 deforms toward the fire side, an air layer 60 forms between the underlay 30 and the overlay 20 on the upper side of the multi-layer structure 10. For example, an air layer formation area A formed on the upper side of the multi-layer structure 10 is illustrated in FIG. 5B.

Since the air layer 60 is formed in at least a partial region between the underlay 30 and the overlay 20 during the fire, heat transfer from the underlay 30 to the overlay 20 is substantially prevented, and thus deformation of the overlay 20 is substantially prevented as illustrated in FIG. 5A. In FIG. 5A, although a case is illustrated in which the overlay 20 does not undergo thermal deformation, in actuality, the upper region of, for example, the overlay 20 does undergo minute thermal deformation. That being said, the amount of deformation is minute compared to that of the underlay 30.

Since the upper region of the underlay 30 deforms toward the fire side and the overlay 20 is hardly deformed, the connection state between the underlay 30 and the overlay 20 is maintained at the lower region and the upper end thereof, with the thermally-deformed multi-layer structure 10 having the air layer 60 on the upper side thereof, as illustrated in FIG. 5A.

If the underlay and the overlay are firmly connected by using a conventional coating amount of an adhesive and a conventional number of staples or the like, an air layer is unlikely to form between the underlay and the overlay in the upper region multi-layer structure, due to thermal deformation of the underlay toward the fire side being restrained by the overlay. In a case where no air layer is formed between the underlay and the overlay, heat on the fire side transfers from the underlay to the overlay on the no-fire side thereby causing deformation, and consequently there is risk that the overlay face member included in the overlay will fall off from the underlay.

The above-described numerical ranges regarding the coating amount of the adhesive 53 and the number of the staples 52 (first fastener) are amounts of the adhesive 53 coated and numbers of the staples 52 used so as to form an adhesive strength that enables the connection between the underlay 30 and the overlay 20 to become physically separated from each other when the multi-layer structure 10 is subjected to the heat (heat on the upper side in a room, for example) during the fire. Therefore, in the multi-layer structure 10 of a building wall 100, the air layer 60 gets formed between the underlay 30 and the overlay 20 owing to the underlay 30 deforming relatively greatly due to the heat during the fire. Therefore, heat transfer to the overlay 20 is substantially prevented, and deformation of the overlay 20 is substantially prevented, and thus, the overlay face member 20A included in the overlay 20 can be prevented from falling off from the underlay 30.

Figure 6:
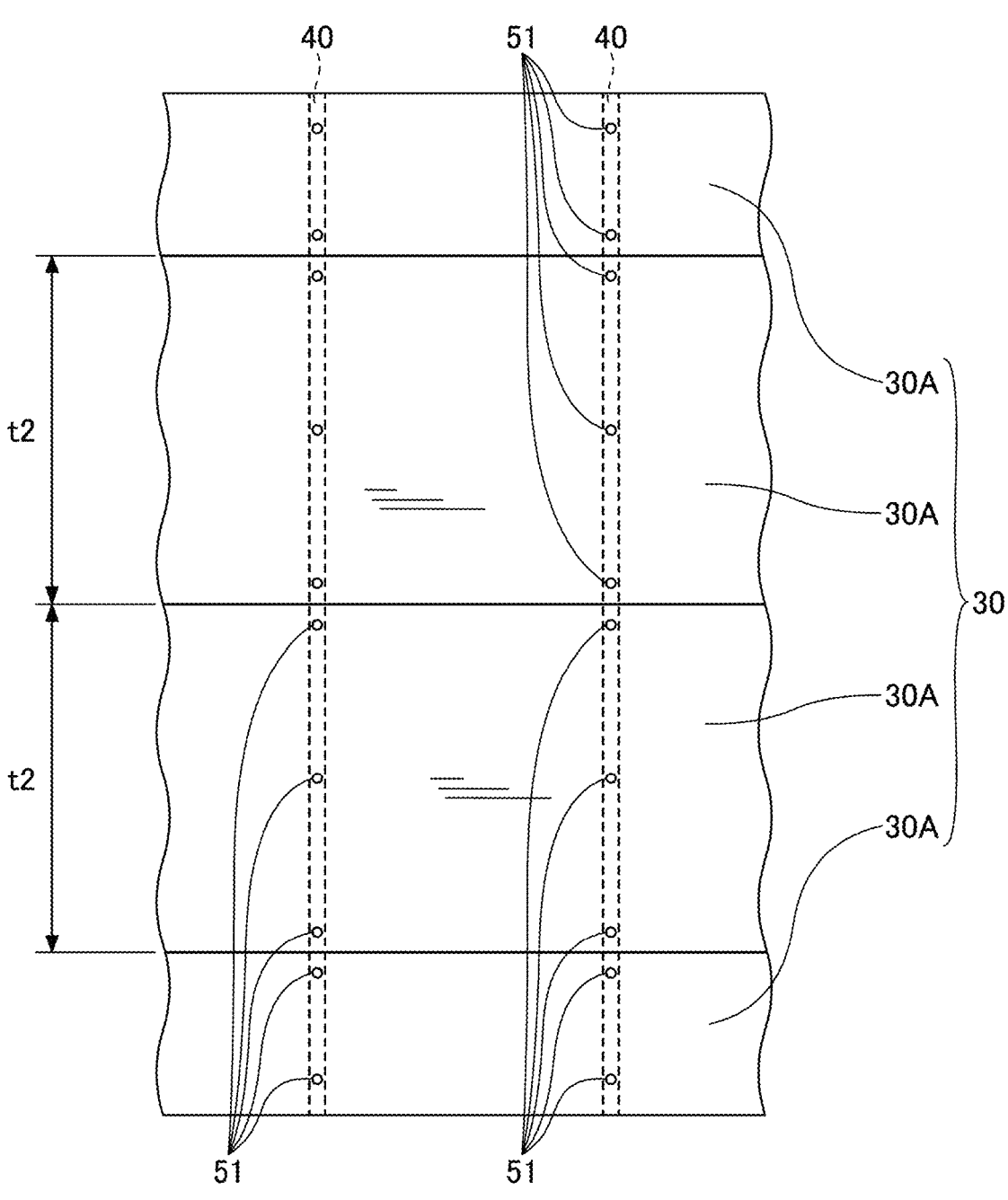
FIG. 6 is a drawing illustrating fastening positions of a second fastener in an example in which an overlay face member is connected to an underlay face member.

FIG. 6 is a front view of an example of the form in which the underlay face members are connected to the studs illustrated in the perspective view illustrated in FIG. 1 and this front view illustrates the fastening positions of the second fasteners.

The underlay face member 30A illustrated in the example in the drawing has substantially the same dimensions as that of overlay face member 20A illustrated in FIG. 2 and so on. As such, the vertical length t2 of the underlay face member 30A is 910 mm which is the same length as the horizontal width t2 of the overlay face member 20A.

As illustrated in the drawing, each underlay face members 30A is connected to respective studs 40 by three fastening members 51 (second fasteners).

More specifically, the number of the fastening members 51 (second faster) is set to be less than 5.0 fastening members/m (fastening members/meters). This amount is less than that of conventional fastening members which is 5.0 fastening members/m. Here, the method of calculating the number of fastening members is the number of the second fasteners 51 to be used for a single board with respect to one stud 40 divided by the length (width) in the direction along the stud 40 of the single board.

The number of the fastening members 51 is preferably in a range of from 1.5 fastening members/m to 4.4 fastening members/m, inclusive, within the larger range of less-than 5.0 fastening members/m. Here, 1.5 fastening members as the number of the fastening members 51 is the minimum number of fastening members necessary for ensuring that the underlay face member 30A is stably fixed to the stud 40.

Next, an example of deformation behavior of the stud, the overlay, and the underlay during a fire and a state of the multi-layer structure during the fire is described with reference to FIG. 7. Here, FIG. 7 is a drawing illustrating an example of the deformation behavior of the stud, the underlay, and the overlay during a fire in a configuration in which the stud and the underlay face member are connected as illustrated in FIG. 6 and a state of the multi-layer structure during the fire.

Figure 7:
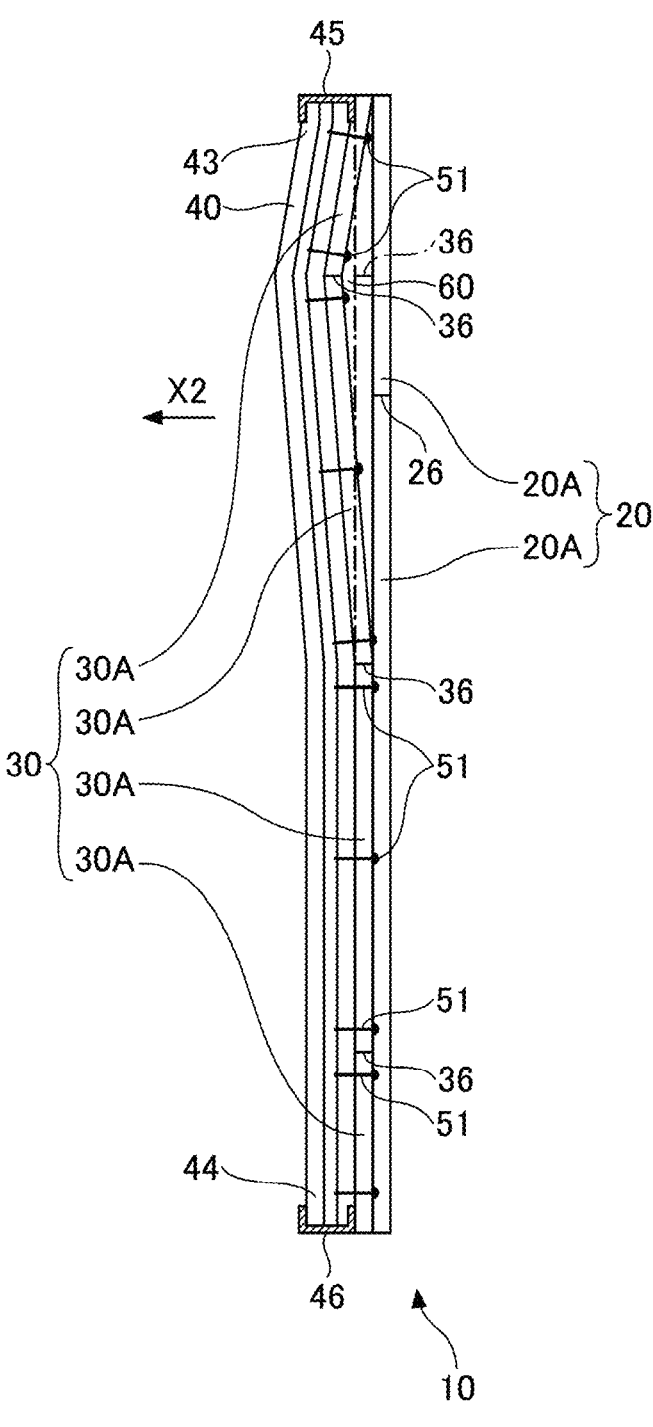
FIG. 7 is a drawing illustrating an example of deformation behavior of a stud, an underlay, and an overlay during a fire in a configuration in which the stud and the underlay face member are connected as illustrated in FIG. 6 and a state of the multi-layer structure during the fire.

As illustrated in FIG. 7, the stud 40 on the fire side and the inner portion of the underlay 30 in the upper region readily become deformed by the heat of the fire, and thus the stud 40 and the underlay 30 deform in the X2 direction toward the fire side as illustrated in the example. Here, in FIG. 7, the dashed-and-dotted line represents the underlay 30 before deformation, whereas the solid line represents the stud 40 and the underlay 30 after deformation.

The inventors of the present application identified that deformation takes place in accordance with the deformation behavior illustrated in FIG. 7 by setting the number of the second fasteners 51 that connect the stud 40 an the underlay 30 together to a value within the previously-described numerical range.

Also, since the upper region of the underlay 30 deforms toward the fire side following the deformation of the stud 40 toward the fire side, an air layer 60 forms between the underlay 30 and the overlay 20 on the upper side of the multi-layer structure 10.

If a structure is used in which the underlay is firmly fixed to the studs by using a conventional number of studs, deformation of the studs during the fire is substantially prevented due to the increased connection strength between the studs and the underlay, and deformation of the underlay is also substantially prevented due to the studs being substantially prevented from deforming. Further, since an air layer is unlikely to form between the underlay and the overlay due to the underlay, which is substantially prevented from deforming, maintaining a position in contact with the overlay, heat during the fire transfers from the underlay to the overlay. When deformation occurs due to this transfer of heat, there is risk that the overlay face member included in the overlay will fall off from the underlay.

The numbers in the above-described numerical range regarding the number of the fastening members 51 (second fastener) that connect the stud 40 and the underlay 30 together are numbers of the fastening members 51 used so as to form a connection strength that enables the connection between the underlay 30 and the overlay 20 to become physically separated from each other when the stud 40 is subjected to the heat (heat on the upper side in a room, for example) during the fire. Therefore, with the stud 40 and the multi-layer structure 10 of the building wall 100, the stud 40 deforms due to the heat during the fire, the underlay 30 deforms following the deformation of the stud 40, and thus the air layer 60 forms between the underlay 30 and the overlay 20. Owing to this, heat transfer to the overlay 20 is substantially prevented and deformation of the overlay 20 is substantially prevented, and thus, the overlay face member 20A included in the overlay 20 can be prevented from falling off from the underlay 30.

Here, since the coating amount of the adhesive 53 and the number of the staples 52 (first fastener) for connecting the underlay 30 and the overlay 20 together are set be within the above-described numerical ranges, and further, the number of the fastening members 51 (second fastener) that connect the stud 40 and the underlay 30 together is set to be within the above-described numerical range, the deformation behavior during the fire can be formed more easily as illustrated in FIG. 7, and thus the effect of preventing the overlay 20 from falling off from the underlay 30 can be further enhanced.

A method for constructing a building wall according to a first embodiment is a method for constructing a building wall that includes at least the underlay face member 30A that is directly or indirectly connected to the stud 40, and the overlay face member 20A that is connected to the underlay face member 30A and faces indoors. The construction method includes an underlay face member-connecting step in which the underlay face member 30A is directly or indirectly connected to the stud 40, and an overlay face member-connecting step in which the overlay face member 20A is connected to the underlay face member 30A via the adhesive 53. Further, in the overlay face member-connecting step, the coating amount of the adhesive 53 is set to be less than 100 g/m$^2$.

A method for constructing a building wall according to a second embodiment includes an underlay face member-connecting step in which the underlay face member 30A is connected to the stud 40 via the second fastener 51, and an overlay face member-connecting step in which the overlay face member 20A is connected to the underlay face member 30A via the first fastener 52. Further, in the overlay face member-connecting step, the number of the first fasteners 52 is set to be 7.2 fasteners/m$^2$ (fasteners/meters$^2$) or more and 32.7 fasteners/m$^2$ or less.

A method for constructing a building wall according to a third embodiment includes an underlay face member-connecting step in which the underlay face member 30A is connected to the stud 40 via the second fastener 51, and an overlay face member-connecting step in which the overlay face member 20A is connected to the underlay face member 30A via the adhesive 53, the first fastener 52, or both. Further, in the underlay face member-connecting step, the number of the second fasteners 51 is set to be less than 5.0 fasteners/m.

Further, a method for constructing a building wall according to a fourth embodiment is a method for constructing a building wall that includes an additional face member that is not illustrated and is connected to the stud 40, the underlay face member 30A that is connected to the additional face member, which is not illustrated, and the overlay face member 20A that is connected to the underlay face member 30A and faces indoors. A method for constructing a building wall according to a second embodiment includes an additional face member-connecting step in which an additional face member is connected to the stud 40 via the second fastener 51, an underlay face member-connecting step in which the underlay face member 30A is connected to the additional face member via the adhesive 53, the first fastener 52, or both, and an overlay face member-connecting step in which the overlay face member 20A is connected to the underlay face member 30A via the adhesive 53, the first fastener 52, or both. Further, in the additional face member-connecting step, the number of the second fasteners 51 is set to be less than 5.0 fasteners/m.

Fire-Resistance Performance Test

The inventors of the present application fabricated a double-sided, double-layered partition wall having a multi-layer structure that is two layers with respect to a stud, one layer being an overlay and the other layer being an underlay. The inventors then attached a thermocouple to approximately the center position (the central position in the height direction of the wall) with respect to the stud and conducted a fire-resistance performance test to measure the temperature.

With one side of the partition wall serving as the heating side, the thermocouple was attached to a region on the non-heating side of the stud.

For this fire-resistance performance test, the underlay and the overlay were connected together by 95 g/m² of adhesive. After this was done, the fire-resistance performance test was conducted. Also, a fire-resistance performance test was conducted in which the overlay and the underlay were connected together by staples numbering 27.2 staples/m². Also, a fire-resistance performance test was conducted in which the stud and the underlay were connected together by fasteners numbering 4.9 fastening members/m. Further, yet another fire-resistance performance test was conducted in which the underlay and the overlay were connected together by 95 g/m² of adhesive and staples numbering 27.2 staples/m² and the stud and the underlay were connected together by fasteners numbering 4.9 fastening members/m. It was confirmed from the results that an air layer was formed between the underlay and the overlay of the multi-layer structure on the non-heated side when the thermocouple reached a temperature of approximately 380° C. to 430° C., inclusive, in all of the fire-resistance performance tests.

Next, a separate fire-resistance performance test was conducted in which the underlay and the overlay were connected together by 50 g/m² of adhesive. It was confirmed from the result that an air layer was formed between the underlay and the overlay of the multi-layer structure on the non-heated side when the thermocouple reached approximately 330° C.

Furthermore, other separate fire-resistance performance tests were conducted in which the amount of adhesive, the number of the staples, and the number of fastening members were changed. For this fire-resistance performance test, the underlay and the overlay were connected together by 10 g/m² to 30 g/m², inclusive, of adhesive. After this was done, the fire-resistance performance test was conducted. Further, fire-resistance performance tests were conducted in which the underlay and the overlay were connected together by 7.2 staples/m² to 19.1 staples/m², inclusive. Further, fire-resistance performance tests were conducted in which the stud and the underlay were connected together by 1.5 fastening members/m to 4.4 fastening members/m, inclusive. Furthermore, other fire-resistance performance tests were conducted in which the underlay and the overlay were connected together by 10 g/m² to 30 g/m², inclusive, of adhesive and staples numbering 7.2 staples/m² to 19.1 staples/m², inclusive, and the stud and the underlay were connected together by fastening members numbering 1.5 fasteners/m to 4.4 fastening members/m, inclusive. It was confirmed from the results that an air layer was formed between the underlay and the overlay of the multi-layer structure on the non-heated side, when the thermocouple reached approximately 230° C. to 280° C., inclusive, in all of the fire-resistance performance tests.

According to the inventors of the present application, it was confirmed that an air layer was formed between the underlay and the overlay included in the multi-layer structure on the non-heating side (no-fire side) owing to the coating amount of the adhesive and the number of staples that connected the underlay and the overlay together, the number of fastening members that connected the stud and the underlay together, being set within the respective above-described numerical ranges. Since the air layer is formed between the underlay and the overlay, heat transfer from the underlay to the overlay on the non-heated side (no-fire side) is substantially prevented, and deformation of the overlay is substantially prevented, the overlay face member included in the overlay can be prevented from falling off from the underlay.

Note that other embodiments, such as those in which other elements are combined with the above configurations, may be used, and the present disclosure is not limited to the configurations illustrated here. The configurations of the present disclosure may be changed without departing from the purpose of the present disclosure, and the configurations can be appropriately determined according to the usage form.

The present international application is based upon and claims priority to Japanese Patent Application No. 2022-017489 filed on Feb. 7, 2022, the entire contents of which are incorporated herein by reference.

EXPLANATION OF REFERENCE NUMERALS

10 Multi-layer structure
20 Overlay
20A Overlay face member
21 Indoor-side surface
22 Back surface
25 Vertical joint (Butt joint)
26 Horizontal joint (Gapped joint)
30 Underlay
30A Underlay face member
31 Front surface
32 Back surface
36 Horizontal joint (Butt joint)
40 Stud
45 Upper runner
46 Lower runner
47, 48 Floor structure
51 Fastening member (Second fastener)
52 Staple (First fastener)
53 Adhesive
60 Air layer
100 Partition wall (Building wall)
A Air layer formation area

The invention claimed is:

1. A building wall provided with at least an underlay face member and an overlay face member, the underlay face member directly or indirectly connected to a stud, the overlay face member being an indoor-facing member and connected to the underlay face member, wherein the overlay face member is connected to the underlay face member via at least one of: an adhesive with purity of from 34% to 38%, inclusive and a first fastener, and wherein a coating amount of the adhesive is less than 100 g/m² as is and not in solid content equivalent in a case of the adhesive, and a number of fasteners of the first fastener is 7.2 fasteners/m² to 32.7 fasteners/m², inclusive, in a case of the first fastener.

2. The building wall according to claim 1, wherein the underlay face member is connected to the stud via a second fastener, and wherein a number of fasteners of the second fastener is less than 5.0 fasteners/m.

3. The building wall according to claim 1, further provided with an additional face member, the additional face member connected to the stud, the underlay face member connected to the additional face member, wherein the underlay face member is connected to the additional face member via a third fastener, wherein the additional face member is connected to the stud via a second fastener, and wherein a number of fasteners of the second fastener is less than 5.0 fasteners/m.

4. The building wall according to claim 1, wherein, the building wall is configured such that, during a fire, the underlay face member located on a side of the fire deforms relatively greatly as compared to the overlay face member, and an air layer is formed between the underlay face member and the overlay face member in a partial region thereof, in a state where the overlay face member does not fall off from the underlay face member.

5. A method of constructing a building wall provided with at least an underlay face member and an overlay face member, the underlay face member directly or indirectly connected to a stud, the overlay face member being an indoor-facing member and connected to the underlay face member, the method comprising:

connecting the underlay face member to the stud directly or indirectly; and connecting the overlay face member to the underlay face member via at least one of: an adhesive with purity of from 34% to 38%, inclusive and a first fastener, wherein a coating amount of the adhesive is set to be less than 100 g/m$^2$ as is and not in solid content equivalent in a case of the adhesive, and a number of fasteners of the first fastener is set to be 7.2 fasteners/m$^2$ to 32.7 fasteners/m$^2$, inclusive, in a case of the first fastener.

6. The method of constructing a building wall according to claim 5, the method further comprising:

connecting the underlay face member to the stud via a second fastener, wherein a number of fasteners of the second fastener is set to be less than 5.0 fasteners/m.

7. The method of constructing a building wall according to claim 5 further provided with an additional face member, the additional face member connected to the stud, the method comprising:

connecting the additional face member to the stud via a second fastener; and connecting the underlay face member to the additional face member via a third fastener, wherein a number of fasteners of the second fastener is set to be less than 5.0 fasteners/m.

* * * * *